(No Model.)
C. A. FORSBERG.
CLAMP.
No. 498,778. Patented June 6, 1893.
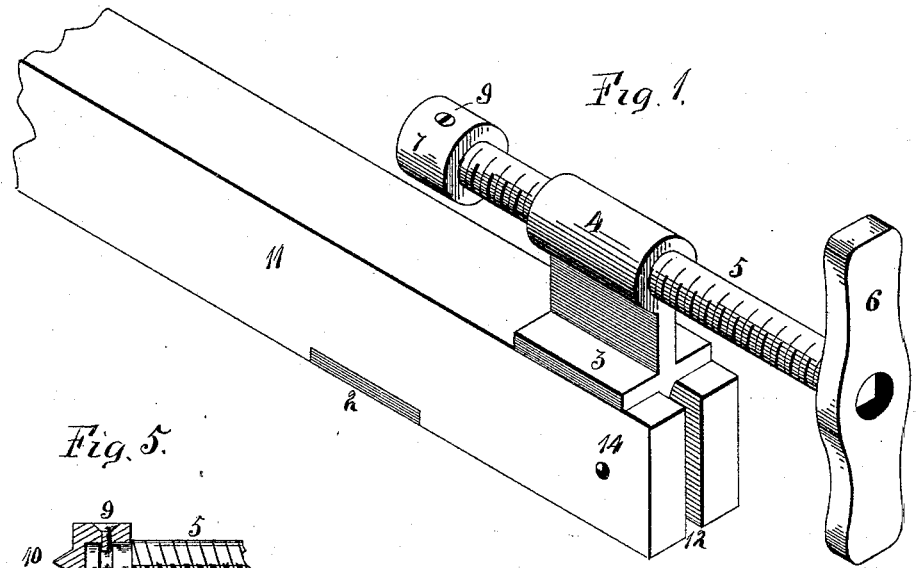
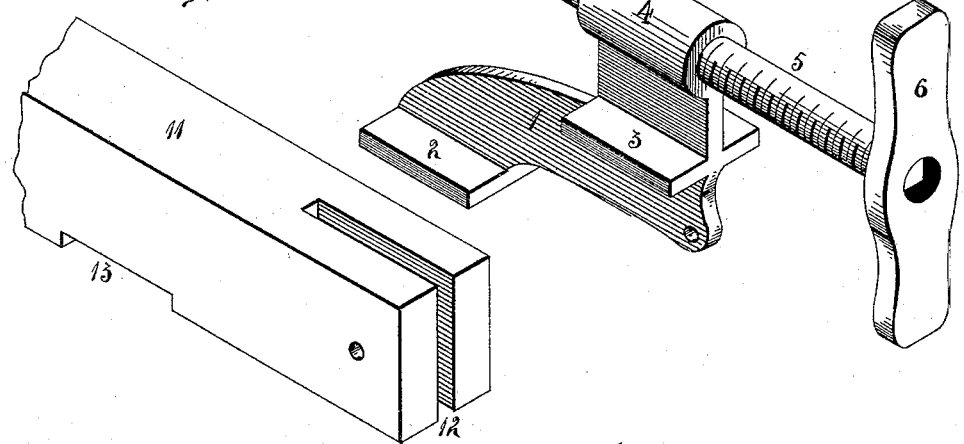
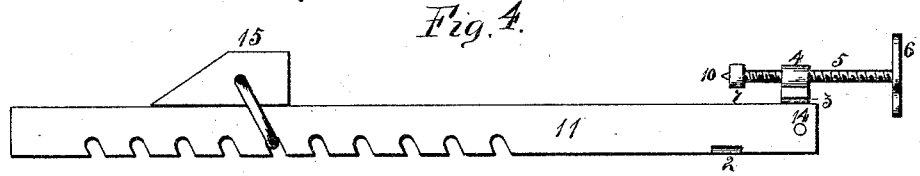
Witnesses:
J. S. Clark
L. A. Clark
Inventor:
Charles A. Forsberg
By A. O. Behel
Atty.

UNITED STATES PATENT OFFICE.

CHARLES A. FORSBERG, OF ROCKFORD, ILLINOIS.

CLAMP.

SPECIFICATION forming part of Letters Patent No. 498,778, dated June 6, 1893.

Application filed September 5, 1892. Serial No. 445,064. (No model.)

*To all whom it may concern:*

Be it known that I, CHARLES A. FORSBERG, a citizen of the United States, residing at Rockford, in the county of Winnebago and State of Illinois, have invented certain new and useful Improvements in Clamps, of which the following is a specification.

The object of this invention is to construct the head portion of a clamp in such a manner as to be readily attached to the beam or woodwork, it having a screw threaded socket, within which is located the clamping screw.

In the accompanying drawings—Figure 1 is an isometrical representation of my improved clamp, held in connection with the woodwork. Fig. 2 is an isometrical representation of the head portion of the clamp removed from the woodwork. Fig. 3 is an isometrical representation of the woodwork, showing the groove and recess for receiving the head portion of the clamp. Fig. 4 is a side elevation of a complete clamp. Fig. 5 is a vertical central section of the swiveled end of the screw.

My improved clamp consists of a vertical web 1, provided with a cross bar 2 at its lower end, and a cross bar 3 at its upper end and a socket 4 extending from the upper face of the cross bar 3. This socket is internally screw threaded and receives a screw 5, which has a handle 6 at its outer end, and a swiveled bearing block 7 at its inner end. The inner end of the screw is provided with a recess 8 and a set screw 9, which has a screw threaded connection with the bearing block and its inner end resting within the recess 8, thereby forming a swivel connection between the bearing block and the screw. The outer end of the bearing block is provided with a pointed stud 10.

The beam 11 for receiving the head of the clamp is provided with a vertical slot 12 and a horizontal groove 13. The web portion of the clamp is inserted in this vertical slot until the cross bar 2 is seated in the groove 13, when a pin 14 passing through the woodwork and vertical web 12, connects the clamp head with the wooden beam. A tail block 15, has an adjustable connection with the beam 11, in order to bring the work within the range of the clamping screw.

The work to be held is placed between the tail block and the end of the screw and by turning the handle 6 the woodwork is firmly held in position.

I claim as my invention—

1. A clamp consisting of a central web, two cross bars and an internally screw threaded socket, a screw for the socket having a handle at one end and a bearing block at its other end.

2. A clamp consisting of a central web, two cross bars and an internally screw threaded socket, a screw for the socket having a handle at one end and a swiveled bearing block at the other end.

CHARLES A. FORSBERG.

Witnesses:
 A. O. BEHEL,
 J. S. CLARK.